(12) United States Patent
Doi et al.

(10) Patent No.: US 9,742,170 B2
(45) Date of Patent: Aug. 22, 2017

(54) ELECTRICAL JUNCTION BOX AND WIRE HARNESS

(71) Applicants: YAZAKI CORPORATION, Tokyo (JP); TOYOTA JIDOSHA KABUSHIKI KAISHA, Aichi-ken (JP)

(72) Inventors: Teppei Doi, Shizuoka (JP); Joh Fujimoto, Shizouka (JP); Hiroki Kawakami, Okazaki (JP)

(73) Assignees: YAZAKI CORPORATION, Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/097,708

(22) Filed: Apr. 13, 2016

(65) Prior Publication Data

US 2016/0308341 A1  Oct. 20, 2016

(30) Foreign Application Priority Data

Apr. 14, 2015 (JP) ................................ 2015-082562

(51) Int. Cl.
| | |
|---|---|
| *H02G 3/10* | (2006.01) |
| *H01B 7/00* | (2006.01) |
| *H02G 3/08* | (2006.01) |
| *B60R 16/023* | (2006.01) |

(52) U.S. Cl.
CPC ......... *H02G 3/083* (2013.01); *B60R 16/0238* (2013.01)

(58) Field of Classification Search
CPC .......... H02G 3/08; H02G 3/081; H02G 3/083; B60R 16/0238; B60R 16/0239; H05K 5/0073; H05K 5/0204
See application file for complete search history.

(56) References Cited

U.S. PATENT DOCUMENTS

| | | | | |
|---|---|---|---|---|
| 2007/0117420 | A1* | 5/2007 | Kinoshita | ............... B60R 11/02 439/76.2 |
| 2010/0133265 | A1* | 6/2010 | Kita | ......................... H02G 3/08 220/3.9 |
| 2010/0300722 | A1* | 12/2010 | Kita | .................... B60R 16/0238 174/50 |
| 2012/0119041 | A1* | 5/2012 | Ikehata | .................... H02G 3/16 248/201 |

(Continued)

FOREIGN PATENT DOCUMENTS

JP    2013-46483 A    3/2013

*Primary Examiner* — Hoa C Nguyen
*Assistant Examiner* — Amol Patel
(74) *Attorney, Agent, or Firm* — Kenealy Vaidya LLP

(57) ABSTRACT

An electrical junction box includes a housing attachable to an object to be attached, a housing support member holding the housing and attachable to the object to be attached, and male and female screw members. The housing support member includes a first portion to be engaged with a first engaging portion in the housing, thereby achieving positioning therewith, a second portion to be engaged with a second engaging portion in the housing, thereby achieving positioning therewith, an extending portion extending between the first and second portions to be engaged, and a through hole provided to an end of the extending portion on the second portion to be engaged side. The housing has a through hole. The through holes are disposed to be concentric in a state that the first and second portions to be engaged are respectively engaged with the first and second engaging portion.

12 Claims, 11 Drawing Sheets

(56) References Cited

U.S. PATENT DOCUMENTS

2014/0166330 A1\* 6/2014 Suzuki ................ B60R 16/0238
   174/50
2015/0288156 A1   10/2015 Suzuki et al.
2015/0318676 A1\* 11/2015 Shiraki ................... H02G 3/08
   174/50

\* cited by examiner

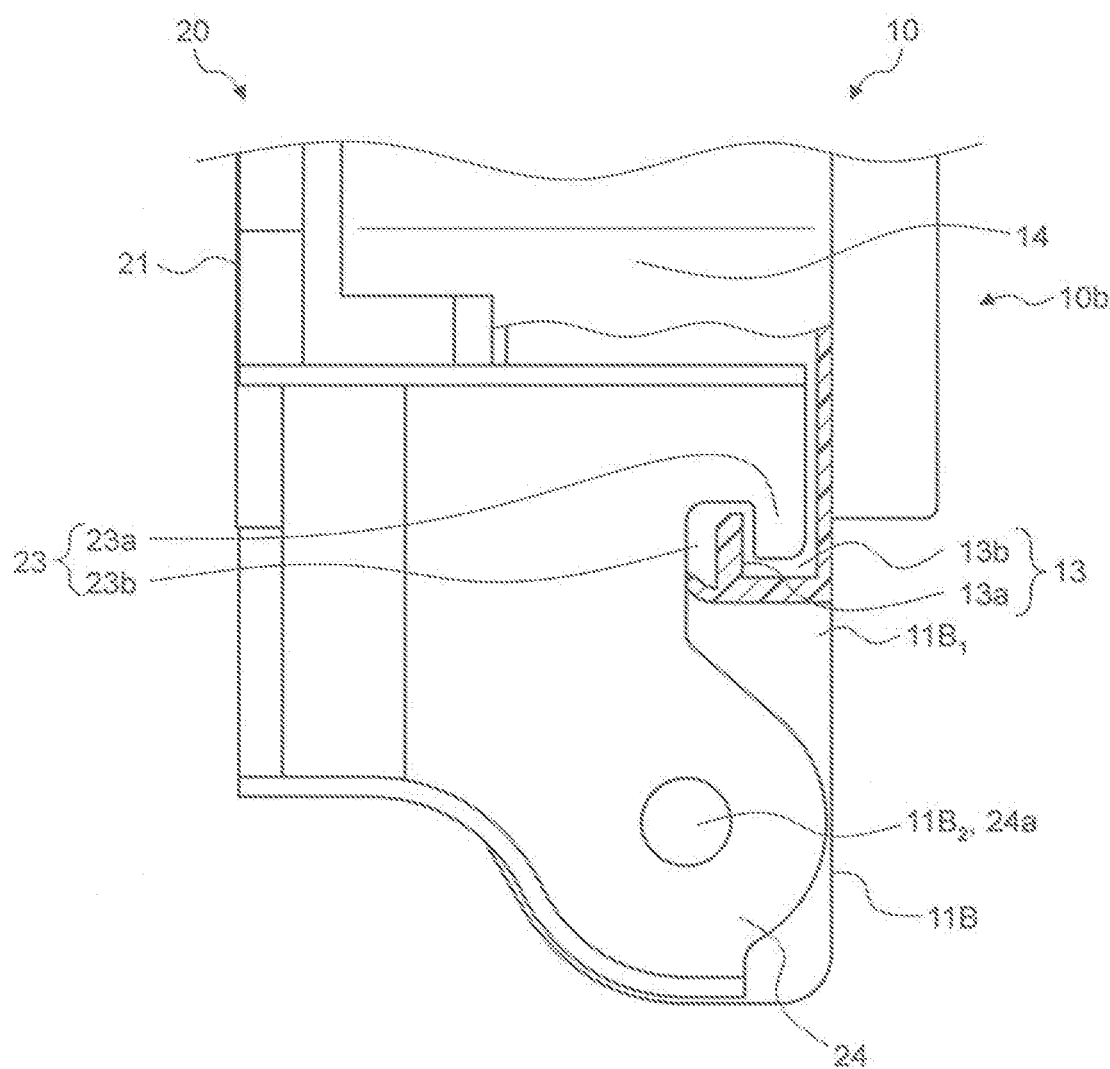

ELECTRICAL JUNCTION BOX AND WIRE HARNESS

CROSS-REFERENCE TO RELATED APPLICATION(S)

The present application claims priority to and incorporates by reference the entire contents of Japanese Patent Application No. 2015-082562 filed in Japan on Apr. 14, 2015.

BACKGROUND OF THE INVENTION

1. Field of the Invention

The present invention relates to an electrical junction box and a wire harness.

2. Description of the Related Art

Conventionally known is an electrical junction box having a parallelepipedal housing, and a sheet-metal bracket extending between two edge regions along a diagonal of the hosing. An example of such an electrical junction box is disclosed in Japanese Patent Application Laid-open No. 2013-046483. The sheet metal bracket is fixed to one of the edge regions of the electrical junction box with a screw. The other edge region of the housing and the sheet metal bracket are together fastened to a vehicle body with a screw member. The electrical junction box is also attached to a vehicle body via a separate attaching portion provided to the sheet metal bracket. In the conventional electrical junction box, a boss is provided to the other edge region in a manner standing from the housing, and the sheet metal bracket is provided with a hole through which the boss is inserted. Before the electrical junction box is attached to the vehicle body, the sheet metal bracket and the housing are fixed with a screw in the one edge region, and are also temporarily fixed with the boss and the hole in the other edge region. The electrical junction box is then attached to the vehicle body, while the housing and the sheet metal bracket are fixed with the screw and temporarily fixed with the boss and the hole.

The conventional electrical junction box, however, has some room for improvement in the workability in assembly of the housing and the sheet metal bracket. For example, until the sheet metal bracket is fixed to the housing in the one edge region with a screw, the sheet metal bracket remains rotatable with respect to the housing about a fulcrum at the boss and the hole. Therefore, when the sheet metal bracket is assembled with the housing, the holes to receive the screw on the housing and the sheet metal bracket in the one edge region may be misaligned. Therefore, the worker needs to align the positions of the holes at the one edge region before fixing the sheet metal bracket to the housing with the screw.

SUMMARY OF THE INVENTION

The present invention has been made in view of the above circumstances, and an object thereof is to provide an electrical junction box that can improve the workability in assembling and a wire harness that is provided with the electrical junction box.

To achieve the above-described objective, an electrical junction box according to one aspect of the present invention includes a housing configured to hold an electronic component, and is provided with a first attaching portion configured to be attachable to a first portion to be attached of an object to be attached; a housing support member configured to hold the housing, and is provided with a second attaching portion configured to be attachable to a second portion to be attached of the object to be attached; and a fixing member configured to fix the housing and the housing support member to each other, wherein the housing support member includes a first portion to be engaged configured to hold the housing and achieve positioning with respect to the housing by being engaged with a first engaging portion of the housing, a second portion to be engaged configured to achieve positioning with respect to the housing by being engaged with a second engaging portion of the housing, an extending portion configured to extend between the first portion to be engaged and the second portion to be engaged along the housing, a through hole portion for inserting the fixing member, that is provided to an end of the extending portion on the second portion to be engaged side, the housing includes a through hole portion for inserting the fixing member, and the through hole portion provided to the housing support member and the through hole portion provided to the housing are disposed to be concentric in a state that the first portion to be engaged and the second portion to be engaged are respectively engaged with the first engaging portion and the second engaging portion.

According to another aspect of the present invention, in the electrical junction box, it is desirable that the second portion to be engaged has a protrusion and a groove that is provided adjacently to the protrusion; the second engaging portion has a groove in which the protrusion is received, and a protrusion that is received by the groove on the second portion to be engaged.

According to still another aspect of the present invention, in the electrical junction box, it is desirable that the second portion to be engaged is engaged with the second engaging portion by rotating the housing support member with respect to the housing about a fulcrum at an end on the second portion to be engaged side of the extending portion, inserting each of the protrusions into the groove of the other, and sliding the housing support member so that the inserted protrusion of the second portion to be engaged slides inside the groove of the second engaging portion toward a bottom of the groove, or by rotating the housing with respect to the housing support member about a fulcrum at an end of the housing on the second engaging portion side, inserting each of the protrusions into the groove of the other, and sliding the housing so that the inserted protrusion of the second engaging portion slides inside the groove of the second portion to be engaged toward a bottom of the groove.

According to still another aspect of the present invention, in the electrical junction box, it is desirable that the first portion to be engaged is a through hole that is provided to the housing support member, the first engaging portion includes a main body that protrudes from the housing and configured to be inserted into the first portion to be engaged, and an engaging hook that protrudes from the main body and configured to be hooked onto a circumferential rim of the first portion to be engaged, and the main body and the engaging hook are inserted into the first portion to be engaged with the rotation and the slide of the housing support member with respect to the housing, or with the rotation and the slide of the housing with respect to the housing support member.

According to still another aspect of the present invention, in the electrical junction box, it is desirable that the housing includes an immobilizing portion configured to immobilize an end of the extending portion on the first portion to be engaged side from a side of the housing in a state that the first portion to be engaged and the first engaging portion are engaged with each other.

According to still another aspect of the present invention, in the electrical junction box, it is desirable that the housing includes an immobilizing portion configured to immobilize an end of the extending portion on the first portion to be engaged side from a side of the housing in a state that the first portion to be engaged and the first engaging portion are engaged with each other, and the immobilizing portion is provided around a base of the main body.

According to still another aspect of the present invention, a wire harness includes an electrical junction box configured to hold an electronic component; and an electric wire that is electrically connected to a terminal of the electronic component, wherein the electrical junction box includes a housing configured to hold the electronic component, and is provided with a first attaching portion configured to be attachable to a first portion to be attached of an object to be attached, a housing support member configured to hold the housing, and is provided with a second attaching portion configured to be attachable to a second portion to be attached of the object to be attached, and a fixing member configured to fix the housing and the housing support member to each other, wherein the housing support member includes a first portion to be engaged configured to hold the housing and achieve positioning with respect to the housing by being engaged with a first engaging portion of the housing, a second portion to be engaged configured to achieve positioning with respect to the housing by being engaged with a second engaging portion of the housing, an extending portion configured to extend between the first portion to be engaged and the second portion to be engaged along the housing, and a through hole portion for inserting the fixing member, that is provided to an end of the extending portion on the second portion to be engaged side, the housing includes a through hole portion for inserting the fixing member, and the through hole portion provided to the housing support member and the through hole portion provided to the housing are disposed to be concentric in a state that the first portion to be engaged and the second portion to be engaged are respectively engaged with the first engaging portion and the second engaging portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is an enlarged partial cross-sectional view of the part denoted by Y in FIG. 10.

DETAILED DESCRIPTION OF THE PREFERRED EMBODIMENTS

Figure 1:
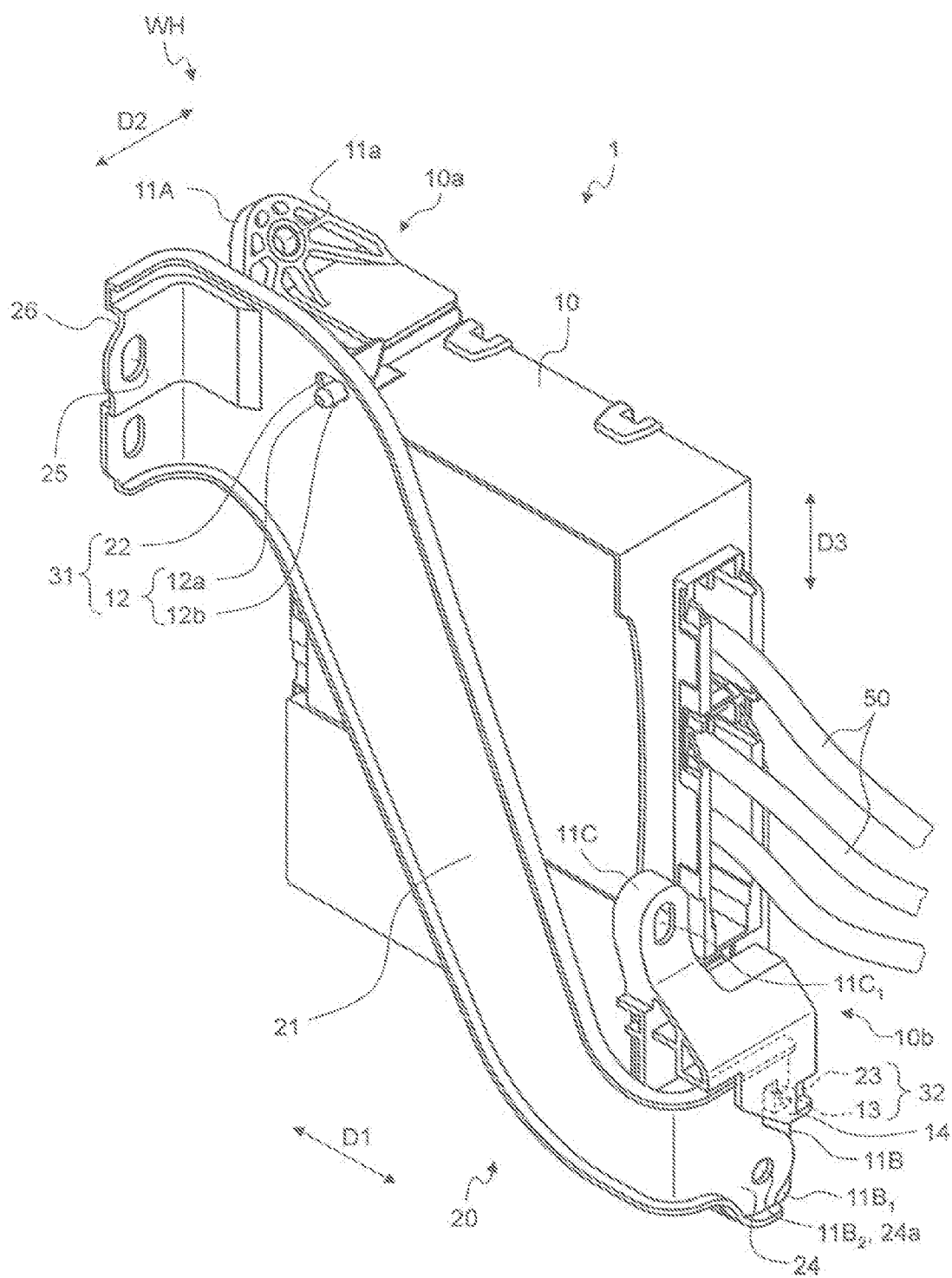
FIG. 1 is a perspective view illustrating an electrical junction box and a wire harness according to an embodiment of the present invention.

An embodiment of an electrical junction box and a wire harness according to the present invention will now be explained in detail with reference to some drawings. The embodiment is, however, not intended to limit the scope of the present invention in any way.

Embodiment

The electrical junction box and the wire harness according to the embodiment will now be explained with reference to FIGS. 1 to 11.

The reference numeral 1 in FIGS. 1 to 4 denotes the electrical junction box according to the embodiment. The reference sign WH in FIG. 1 denotes a wire harness having the electrical junction box 1. The electrical junction box 1 according to the embodiment may be interposed between a power source (secondary battery) and an electronic device both of which are not illustrated, and adjusts the power supplied from the power source to the electronic device, for example. The electrical junction box 1 and the wire harness WH are mounted on the vehicle body serving as an object to be attached 100 (FIGS. 2 and 4), and installed between the power source and the electronic device in the vehicle, for example. The electrical junction box 1 is also capable of passing a detection signal of a sensor not illustrated to a control device, as another example. This electrical junction box 1 may be generally referred to as a relay box, a fuse box, a junction box, or a junction block. In the drawings, a junction block is used as an example.

The electrical junction box 1 includes a housing 10 for holding an electronic component (not illustrated) or the like. The housing 10 is made of an insulating material such as synthetic resin, and has a parallelepipedal shape. Examples of the electronic component include a relay, a fuse, and a fusible link. The electronic component, for example, is held by the housing 10 in a manner housed in an enclosure provided inside of the housing 10. Electric wires 50 are connected electrically to the respective terminals (e.g., those made of a conductive material such as a metal) of the electronic component, directly or indirectly (FIG. 1). The electric wires 50 are pulled out from the internal to the external of the housing 10.

Figure 4:
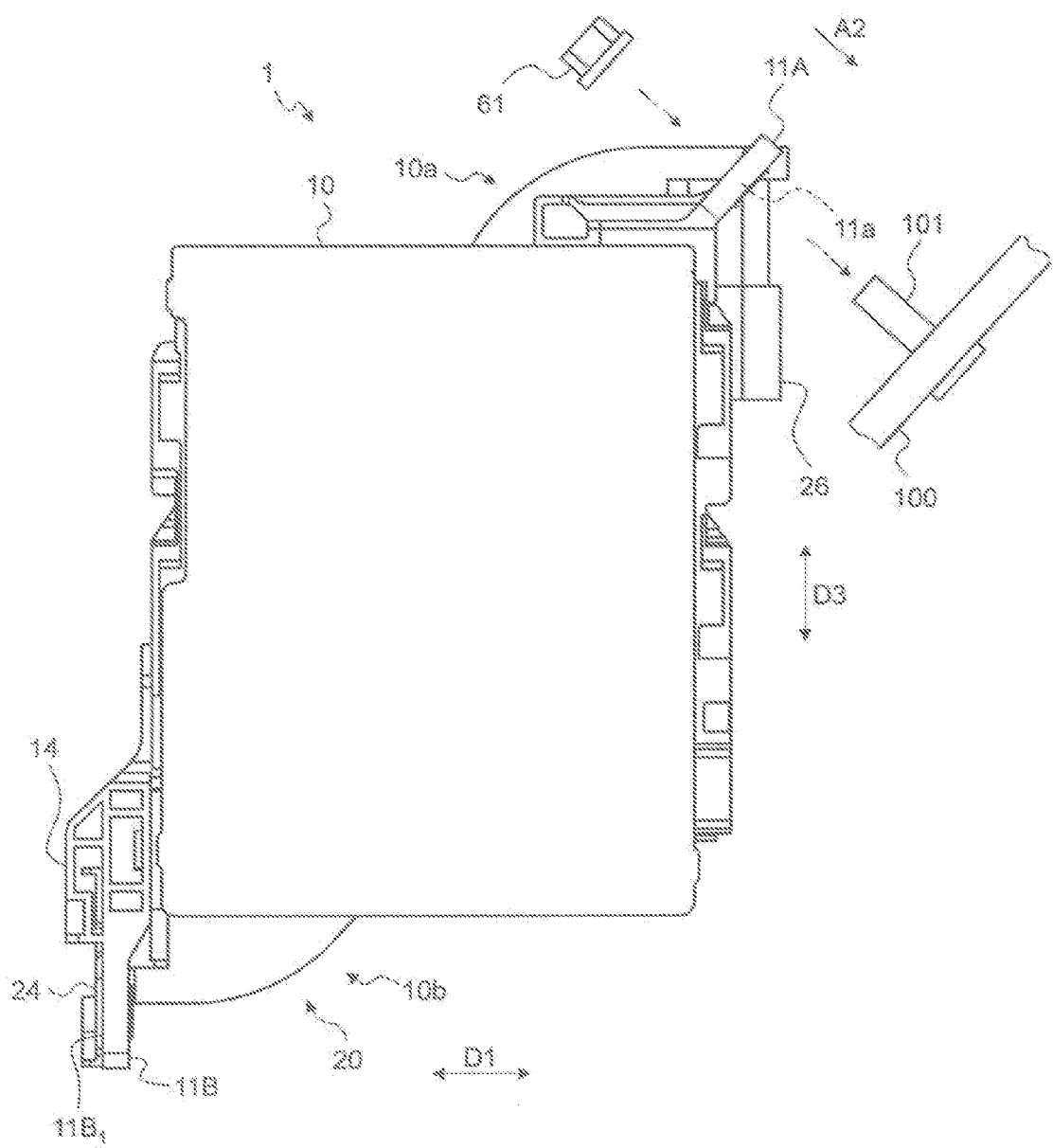
FIG. 4 is a rear view illustrating the electrical junction box according to the embodiment.

The housing 10 is provided with a first attaching portion 11a for attaching the housing 10 to the object to be attached (vehicle body) 100. The first attaching portion 11a can be attached to a first portion to be attached 101 provided to the object to be attached 100 (FIG. 4). In other words, the housing 10 is attached to the object to be attached 100 via the first attaching portion 11a and the first portion to be attached 101. In this example, as illustrated in FIG. 4, the first portion to be attached 101 is a stud bolt protruding from the object to be attached 100, and the first attaching portion 11a is a through hole portion through which the first portion to be attached (stud bolt) 101 is inserted. The housing 10 is fixed to the object to be attached 100 by passing the first portion to be attached (stud bolt) 101 through the first attaching portion (through hole portion) 11a, and screwing a nut 61 onto the first portion to be attached 101 (FIG. 4).

In the embodiment, the region between two adjacent corners of the housing 10 is referred to as an edge region. The first attaching portion 11a is provided to one of a plurality of edge regions of the housing 10. In this example, the first attaching portion 11a is positioned in a first edge region 10a. In the first edge region 10a, a first foot 11A is provided standing from the external wall of the housing 10, and the first attaching portion 11a is provided to the first foot 11A. The first attaching portion 11a may be a through hole with an axial line extending along a direction A1 in which a housing support member 20 described later is attached to the object to be attached 100 (hereinafter, referred to as a "first attaching direction") (FIG. 2), and may be a through hole with an axial line extending along another direction that is not the first attaching direction A1. In this example, the first attaching portion 11a is explained to be the latter. In other words, the first foot 11A is attached to the object to be attached 100 in a direction A2 (hereinafter, referred to as a "second attaching direction") (FIG. 4) extending at a different angle from the direction in which the housing support member 20 is attached. The first foot 11A has a flat surface around the first attaching portion (through hole) 11a, on the side facing the object to be attached 100. The flat surface is provided to abut against the object to be attached 100, and extends perpendicularly to the axial line direction of the first attaching portion 11a (that is, perpendicularly to the direction in which the first foot 11A is attached to the object to be attached 100). The first foot 11A explained in this example is made of an insulating material such as a synthetic resin. The first foot 11A may be integrated with the housing 10 as a member that is separate from the housing 10, or may be molded integrally with the housing 10. Hereinafter, the first attaching direction A1 may also be referred to as a "first direction D1" in the electrical junction box 1.

Figure 5:
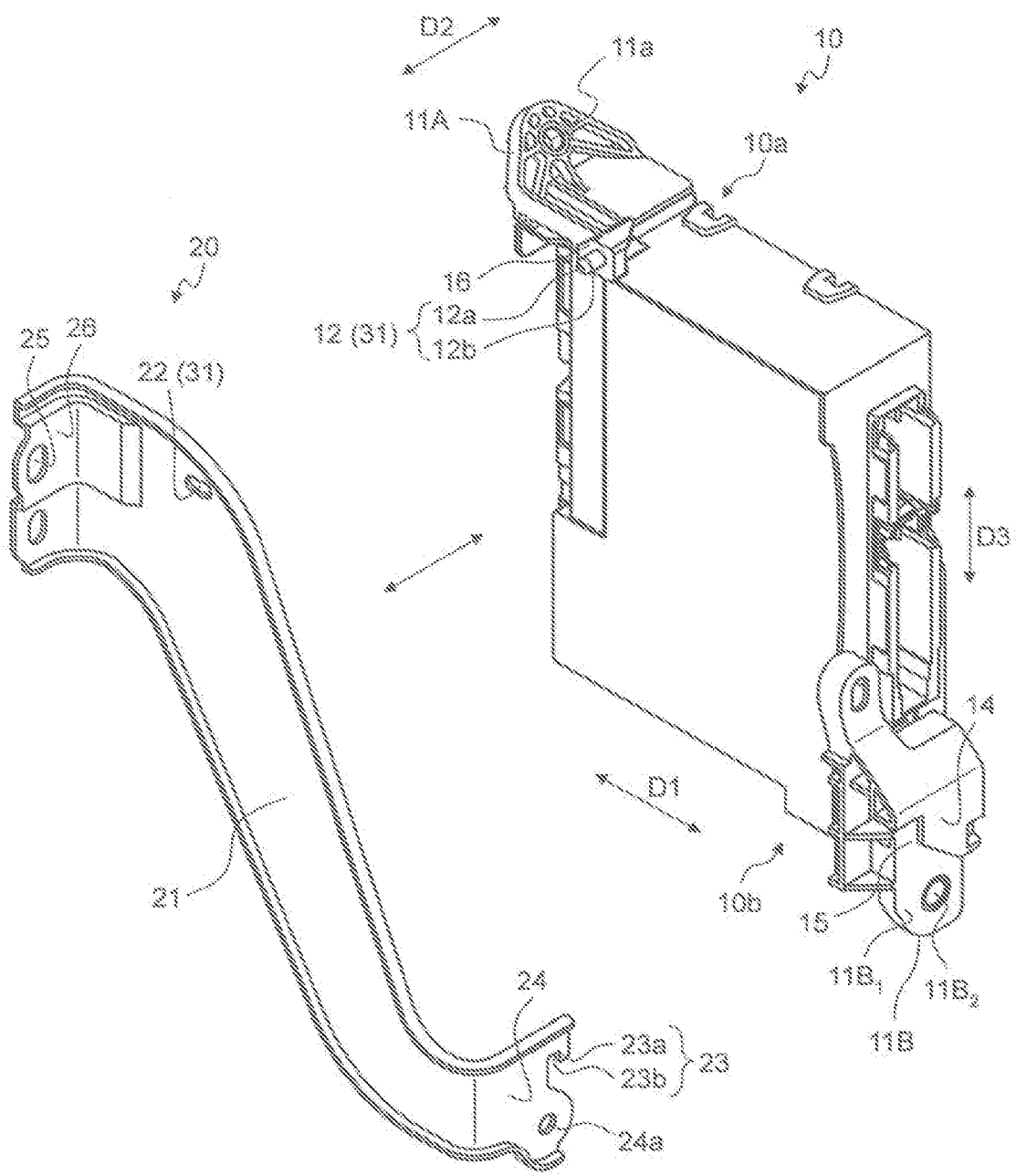
FIG. 5 is a perspective view illustrating the electrical junction box according to the embodiment, giving an exploded view into a housing and a housing support member.
Figure 6:
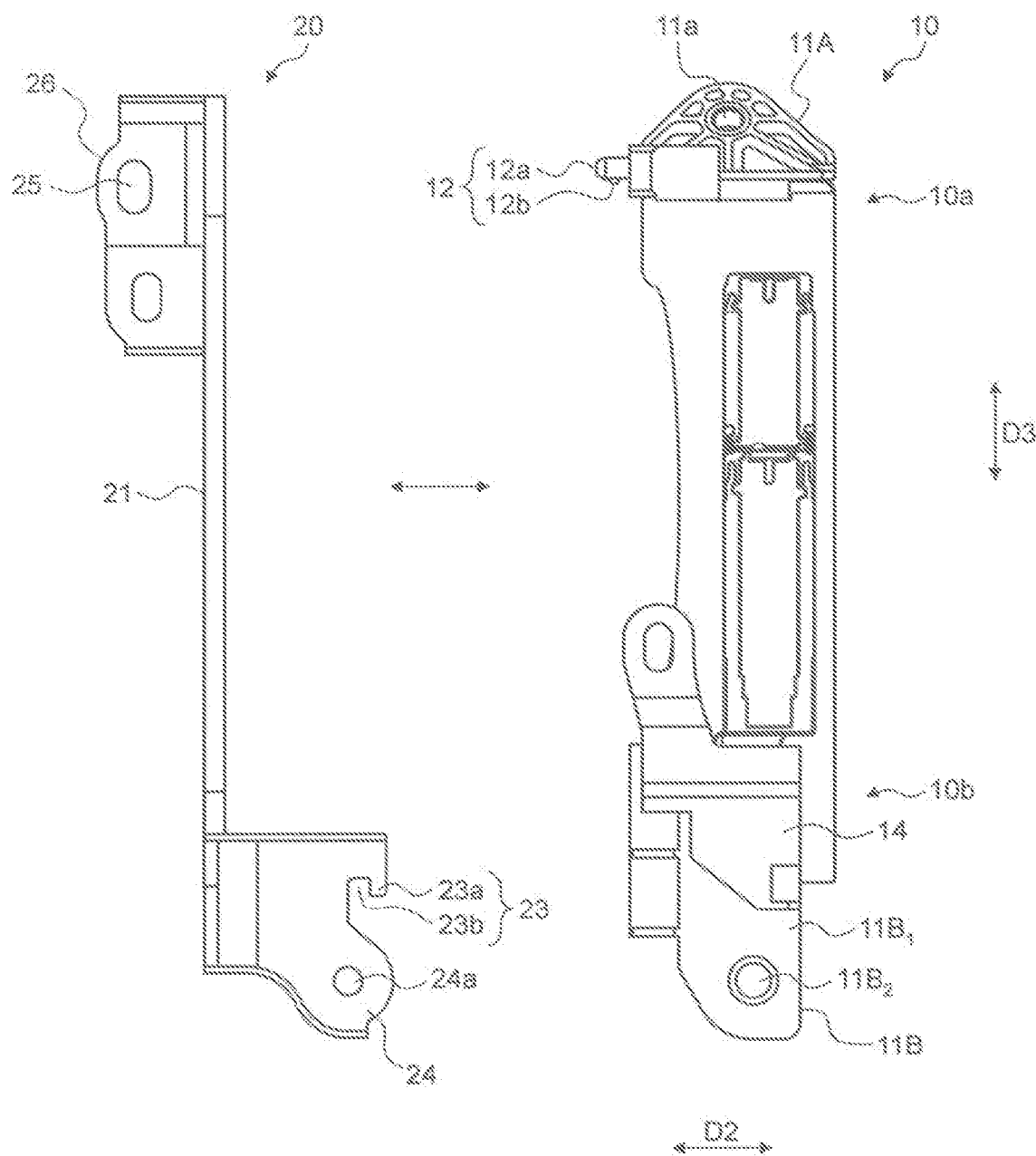
FIG. 6 is a side view illustrating the electrical junction box according to the embodiment, giving an exploded view into the housing and the housing support member.

In an edge region (second edge region) 10b that is positioned diagonally with respect to the first edge region 10a, the housing 10 has a second foot 11B. The second foot 11B is provided standing from the external wall of the housing 10, in the same manner as the first foot 11A. The second foot 11B has a perpendicular flat surface $11B_1$, being perpendicular to the first attaching direction A1 (FIGS. 5 and 6). On the second foot 11B explained in this example, the perpendicular flat surface $11B_1$ is positioned on the opposite side of the object to be attached 100, and the second foot 11B is provided with a through hole $11B_2$ extending perpendicularly to the perpendicular flat surface $11B_1$ (that is, a through hole with an axial line extending along the first attaching direction A1).

The housing 10 also has a third foot 11C in the second edge region 10b. The third foot 11C is positioned nearer to the housing 10 than the second foot 11B. The third foot 11C has a through hole $11C_1$ with an axial line extending along the first attaching direction A1.

The electrical junction box 1 includes a housing support member 20 that is attached to the object to be attached 100 while holding the housing 10. Because the housing support member 20 holds the housing 10, the housing support member 20 is made of a material stronger than that of the first foot 11A or the second foot 11B. The housing support member 20 explained in this example is a press-formed member made from a metal plate, as an example.

The housing support member 20 has an extending portion 21 that extends along the housing 10. The extending portion 21 explained in this example extends between the first edge region 10a and the second edge region 10b along the housing 10 (in other words, between a first portion to be engaged 22 and a second portion to be engaged 23 which will be described later). The extending portion 21 is arranged in a manner facing the housing 10, and spaced from the housing 10. The extending portion 21 has a flat surface portion extending in parallel with the first attaching direction A1 of the housing support member 20, and facing the housing 10.

A first engaging mechanism 31 and a second engaging mechanism 32 are provided between the housing support member 20 and the housing 10. The first engaging mechanism 31 allows the housing support member 20 to hold the housing 10, and achieve a positioning between the housing support member 20 and the housing 10. This first engaging mechanism 31 includes a first engaging portion 12 provided to the housing 10, and the first portion to be engaged 22 provided to the housing support member 20. The second engaging mechanism 32 is also provided at a position different from the position where the first engaging mechanism 31 is provided, to achieve a positioning between the housing support member 20 and the housing 10. The second engaging mechanism 32 includes a second engaging portion 13 provided to the housing 10, and the second portion to be engaged 23 provided to the housing support member 20.

On the housing 10, the first engaging mechanism 31 is positioned on the side of the first edge region 10a, and the engagement between the first engaging portion 12 and the first portion to be engaged 22 enables the housing support member 20 to hold the housing 10, and achieves the positioning between the housing 10 and the housing support member 20. In the first engaging mechanism 31, one of the first engaging portion 12 and the first portion to be engaged 22 is provided as a protrusion protruding toward the other, and the other is provided as a through hole through which the protrusion is inserted. The protruding direction is matched with the direction perpendicular to the flat surface portion of the extending portion 21. Hereinafter, the protruding direction is referred to as a "second direction D2" in the electrical junction box 1. In this example, the first engaging portion 12 is provided as a protrusion, and the first portion to be engaged 22 is provided as a through hole.

Figure 2:
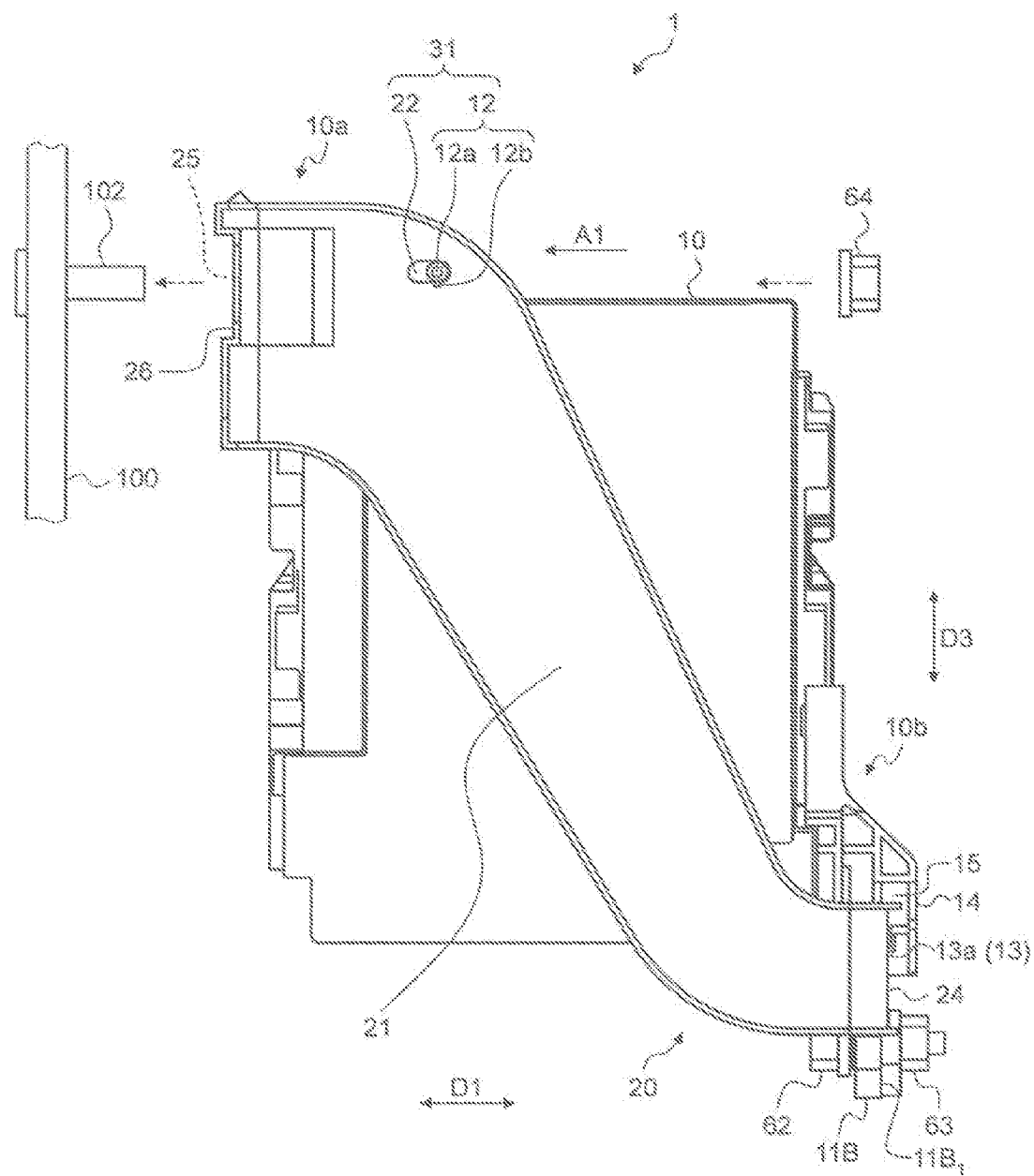
FIG. 2 is a front view illustrating the electrical junction box according to the embodiment.
Figure 3:
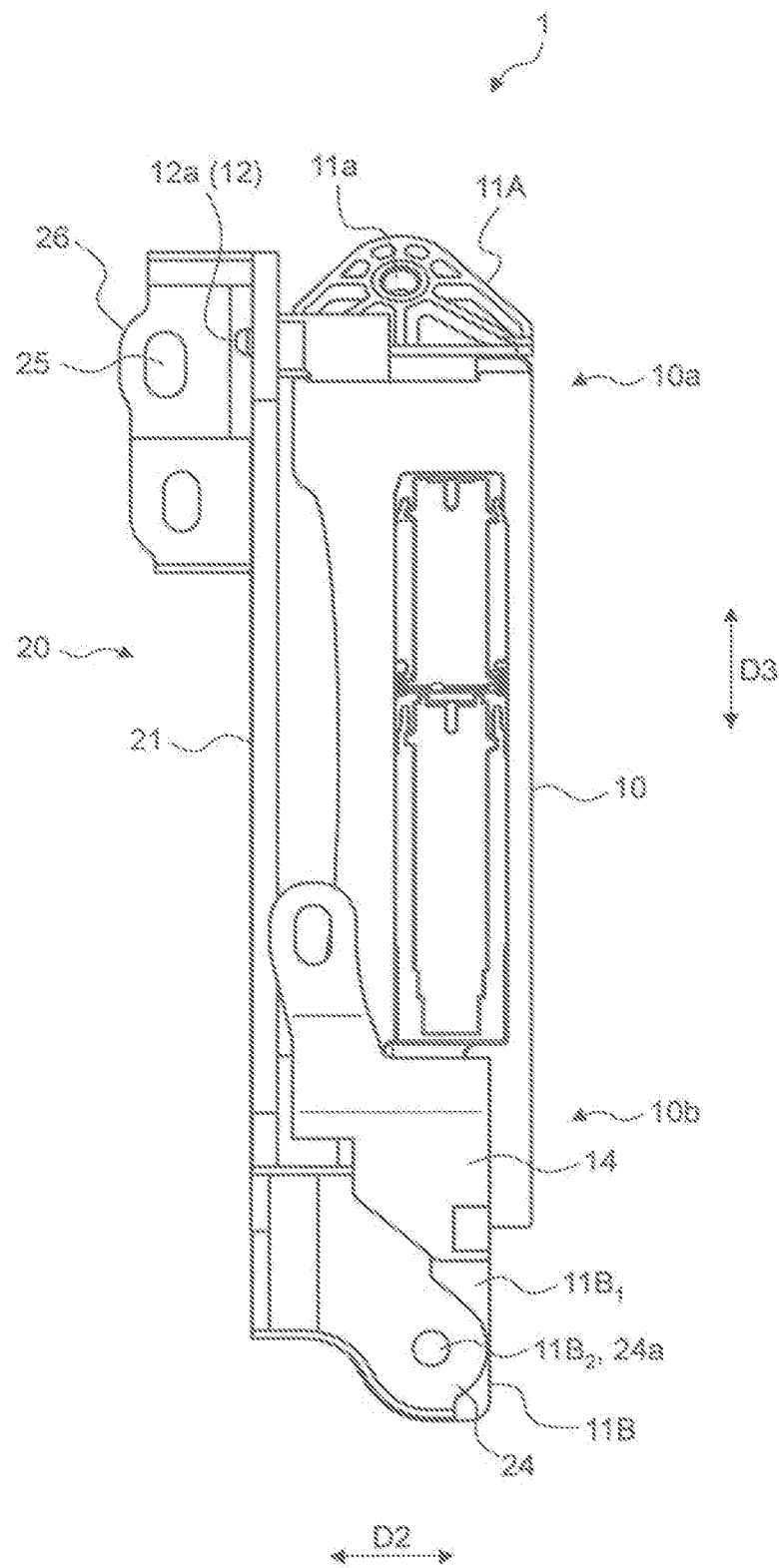
FIG. 3 is a side view illustrating the electrical junction box according to the embodiment.

The first engaging portion 12 is a protrusion protruding from the housing 10 on the side of the first edge region 10a, toward the extending portion 21. The first engaging portion 12 protrudes from the housing 10, and has a main body 12a that is inserted into the first portion to be engaged 22 provided as a through hole, and an engaging hook 12b protruding from the main body 12a and hooked onto the circumferential rim of the first portion to be engaged (through hole) 22 (FIGS. 1, 2, and 6). The main body 12a has a cylindrical or columnar shape with an axial line direction extending toward the second direction D2. The engaging hook 12b protrudes externally radially from the outer circumferential surface of an end (that is, the protruding end) of the main body 12a. The first portion to be engaged 22 is provided as a hole with a shape allowing the first engaging portion 12 to be inserted and the engaging hook 12b to be hooked. In this example, in consideration of the dimensional tolerance and the assembly tolerance of the parts and portions such as the housing 10, the housing support member 20, the first engaging portion 12, and the first portion to be engaged 22, the first portion to be engaged 22 is provided as a long hole extending along the first attaching direction A1. The engaging hook 12b, in turn, protrudes from the outer circumferential surface of the main body 12a in such a manner that the engaging hook 12b hooks onto one short-hand side circumferential rim of the first portion to be engaged 22 that is provided as a long hole. Hereinafter, the short-hand direction of the long hole is referred to as a "third direction D3" in the electrical junction box 1.

This first engaging mechanism 31 enables the housing support member 20 to hold the housing 10 on the side of the first edge region 10a. The first engaging mechanism 31 therefore can suppress the disengagement between the housing 10 and the housing support member 20. Furthermore, the first engaging mechanism 31 not only positions the housing 10 and the housing support member 20 in the second direction D2 (the protruding direction of the first engaging portion 12), but also positions the housing 10 and the housing support member 20 in the third direction D3 (the short-hand direction of the first portion to be engaged 22 provided as a long hole). Therefore, the first engaging mechanism 31 can prevent the positional displacement of the housing 10 and the housing support member 20 in the second direction D2 and the third direction D3. The positioning and the positional displacement prevention between the housing 10 and the housing support member 20 in the first direction D1 is implemented on the side of the second edge region 10b in the manner described below.

Figure 7:
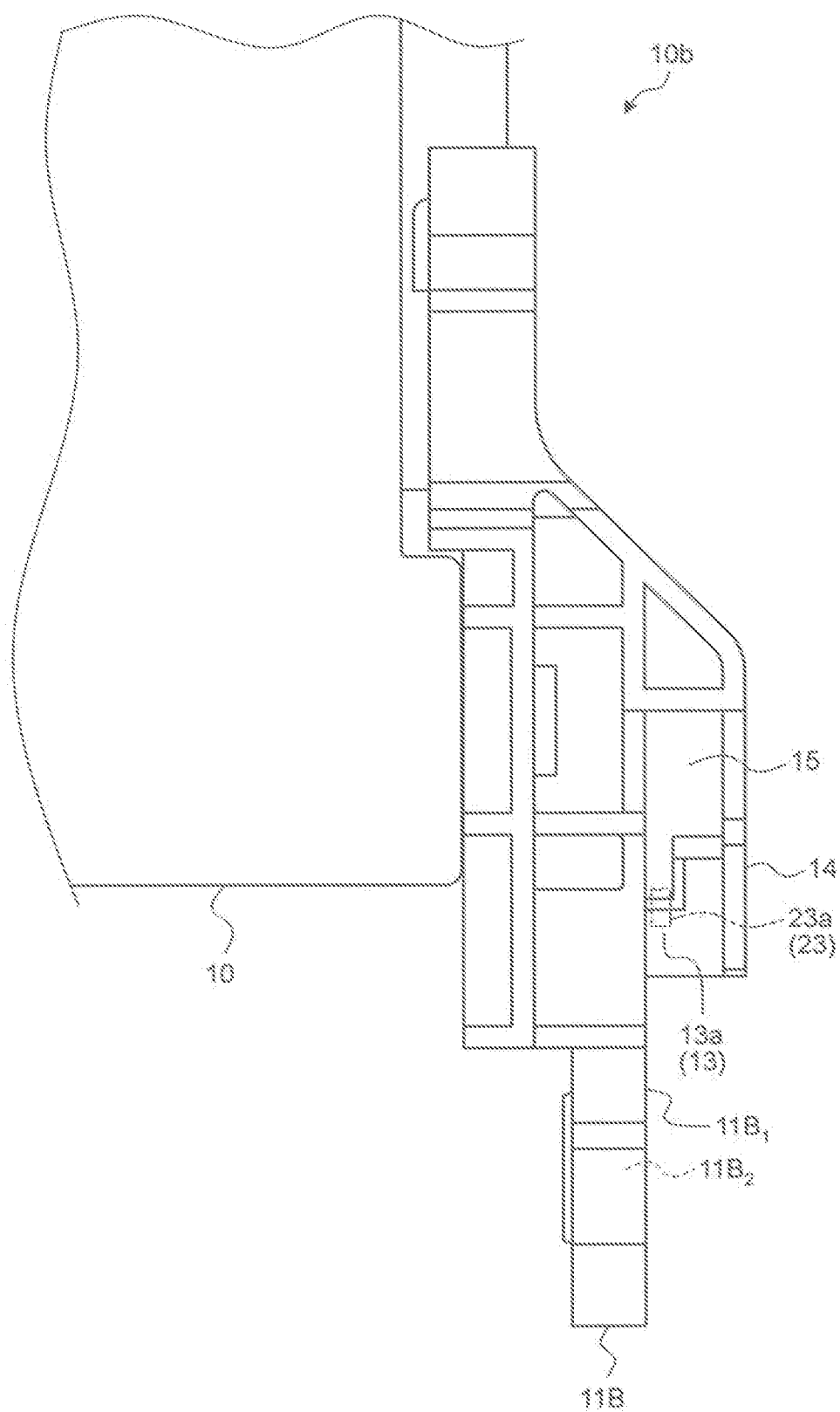
FIG. 7 is an enlarged view of the housing, giving a view of a second edge region from the front.

The second engaging mechanism 32 is positioned on the side of the second edge region 10b of the housing 10, and the engagement between the second portion to be engaged 23 and the second engaging portion 13 achieves the positioning between the housing 10 and the housing support member 20. The housing 10 has a wall 14 provided spaced from the perpendicular flat surface $11B_1$ of the second foot 11B, being spaced in a direction moving away from the housing 10, and having a facing flat surface extending in parallel with the perpendicular flat surface $11B_1$. The second engaging mechanism 32 is positioned in the space 15 between the second foot 11B and the wall 14 (FIG. 7). The housing support member 20 is provided with a first protruding piece 24 protruding along the perpendicular flat surface $11B_1$, on the side of the second edge region 10b of the extending portion 21. The first protruding piece 24 has a flat surface that faces and abuts the perpendicular flat surface $11B_1$. A part of the first protruding piece 24 is inserted into the space 15 between the second foot 11B and the wall 14. The second engaging mechanism 32 therefore includes a second engaging portion 13 provided in the space 15 on the side of the housing 10, and the second portion to be engaged 23 provided to a part of the first protruding piece 24 to be inserted into the space 15.

The second engaging portion 13 has a protrusion 13a and a groove 13b that is adjacently positioned to the protrusions 13a, and the second portion to be engaged 23 has a protrusion 23a and a groove 23b that is adjacently positioned to the protrusions 23a, being adjacent in the second direction D2 in the electrical junction box 1 (FIGS. 8 to 11). In the second engaging mechanism 32, the groove 23b in the second portion to be engaged 23 receives the protrusion 13a in the second engaging portion 13, and the groove 13b in the second engaging portion 13 receives the protrusion 23a in the second portion to be engaged 23. In other words, the second engaging portion 13 has the groove 13b that receives the protrusion 23a in the second portion to be engaged 23, and the protrusion 13a to be received by the groove 23b in the second portion to be engaged 23. The second portion to be engaged 23 has a groove 23b that receives the protrusion 13a in the second engaging portion 13, and the protrusion 23a to be received by the groove 13b in the second engaging portion 13.

With such a structure, the second engaging mechanism 32 can achieve the positioning and the positional displacement prevention between the housing 10 and the housing support member 20 in the second direction D2. The first protruding piece 24 having the second portion to be engaged 23 abuts the perpendicular flat surface $11B_1$. Therefore, in the electrical junction box 1, the first protruding piece 24 and the perpendicular flat surface $11B_1$ can also achieve the positioning and the positional displacement prevention between the housing 10 and the housing support member 20 in the first direction D1.

The electrical junction box 1 includes a fixing member for fixing the housing support member 20 to the housing 10. The second foot 11B on the housing 10 is provided with the through hole $11B_2$ to receive the fixing member. The housing support member 20 is provided with a through hole 24a to receive the fixing member at the end of the extending portion 21 on the second portion to be engaged 23 side. Specifically, in the electrical junction box 1 explained in this example, by fixing the end of the extending portion 21 on the second portion to be engaged 23 side to the housing 10 with a screw, the housing support member 20 is enabled to hold the housing 10 on the side of the second edge region 10b. In this example, the first protruding piece 24 provided to the end of the extending portion 21 is fixed to the second foot 11B on the housing 10 with a screw. Therefore, the through hole 24a is provided to the first protruding piece 24. This through hole 24a and the through hole $11B_2$ on the second foot 11B are concentrically positioned in a state that both of the first engaging mechanism 31 and the second engaging mechanism 32 are in a engaged state. The worker therefore assembles the housing 10 and the housing support member 20 in such a manner that the first engaging mechanism 31 becomes engaged with the second engaging mechanism 32, and then inserts a male screw member 62 serving as a fixing member into the through hole $11B_2$ and the through hole 24a, and tightens the male screw member 62 into a female screw member 63 serving as a counterpart fixing member (FIG. 2). In this manner, the housing 10 is held by the housing support member 20 on the side of the second edge region 10b.

The electrical junction box 1 assembled in the manner described above is attached to the object to be attached 100 also via the housing support member 20. The housing support member 20 has a second attaching portion 25 that can be attached to a second portion to be attached 102 provided to the object to be attached 100 (FIG. 2). In this example, as illustrated in FIG. 2, a stud bolt protruding from the object to be attached 100 is provided as the second portion to be attached 102, and a through hole through which the second portion to be attached (stud bolt) 102 is inserted is provided as the second attaching portion 25. The second attaching portion 25 is a through hole portion having an axial line extending along the first attaching direction A1, and is provided to a second protruding piece 26 disposed at the end of the extending portion 21 on the side of the first edge region 10a. The second protruding piece 26 protrudes from the extending portion 21 in a direction moving away from the housing 10 in the second direction D2. The circumferential rim of the second attaching portion 25 of the second protruding piece 26 is provided with a flat surface on the object to be attached 100 side, that faces and abuts the flat surface provided around the second portion to be attached 102 on the object to be attached 100. These flat surfaces are flat surfaces that are perpendicular to the first attaching direction A1 and the axial line direction of the second portion to be attached (stud bolt) 102. The housing support member 20 is then fixed to the object to be attached 100 by inserting the second portion to be attached (stud bolt) 102 into the second attaching portion (through hole) 25, and fastening a nut 64 onto the second portion to be attached 102.

Because the electrical junction box 1 is attached to the vehicle body that receives inputs of vibrations from a road surface or the like, the inputs of vibrations transmitted to the electrical junction box 1 may cause a rattle of the housing 10 and the housing support member 20, and to generate noise or vibration. The housing 10 is less likely to rattle with respect to the housing support member 20 on the side of the second edge region 10b because the housing support member 20 is fixed to the housing 10 with a screw. On the side of the first edge region 10a, however, because only the engagement of the first engaging mechanism 31 holds the housing 10 and the housing support member 20 together, a rattle between the housing 10 and the housing support member 20 may occur and generate noise or vibration depending on the configuration of the engagement.

To address this issue, the housing 10 is provided with an immobilizing portion 16 that immobilizes the end of the extending portion 21 on the first portion to be engaged 22 side from the side of the housing 10 in a state that the first engaging mechanism 31 is engaged (FIG. 5). The first engaging mechanism 31 suppresses disengagement between the housing 10 and the housing support member 20 by hooking the engaging hook 12b onto the circumferential rim of the first portion to be engaged (through hole) 22. Therefore, the first engaging mechanism 31 can suppress looseness in the direction separating the housing 10 and the housing support member 20. The immobilizing portion 16, by contrast, suppresses looseness in the direction bringing the housing 10 and the housing support member 20 near to each other, by abutting the extending portion 21 in a state that the first engaging mechanism 31 is engaged. Because rattling between the housing 10 and the housing support member 20 is suppressed while the first engaging mechanism 31 is engaged, the electrical junction box 1 is enabled to suppress noise or vibration generated by the electrical junction box 1 itself.

It is preferable for the immobilizing portion 16 to be provided around the base of the main body 12a of the first engaging portion 12. Used as the immobilizing portion 16 in such a configuration is an abutting surface provided around the base of the main body 12a for abutting the extending portion 21 when the first engaging mechanism 31 is in the engaged state. The abutting surface is provided around the entire circumferential rim of the base of the main body 12a. The immobilizing portion 16 may also protrude from the housing 10 at a position away from the main body 12a of the first engaging portion 12.

A process of assembling the electrical junction box 1 and a process of attaching the electrical junction box 1 to the object to be attached 100 will now be explained.

To begin with, a worker assembles the housing support member 20 to the housing 10.

Figure 8:
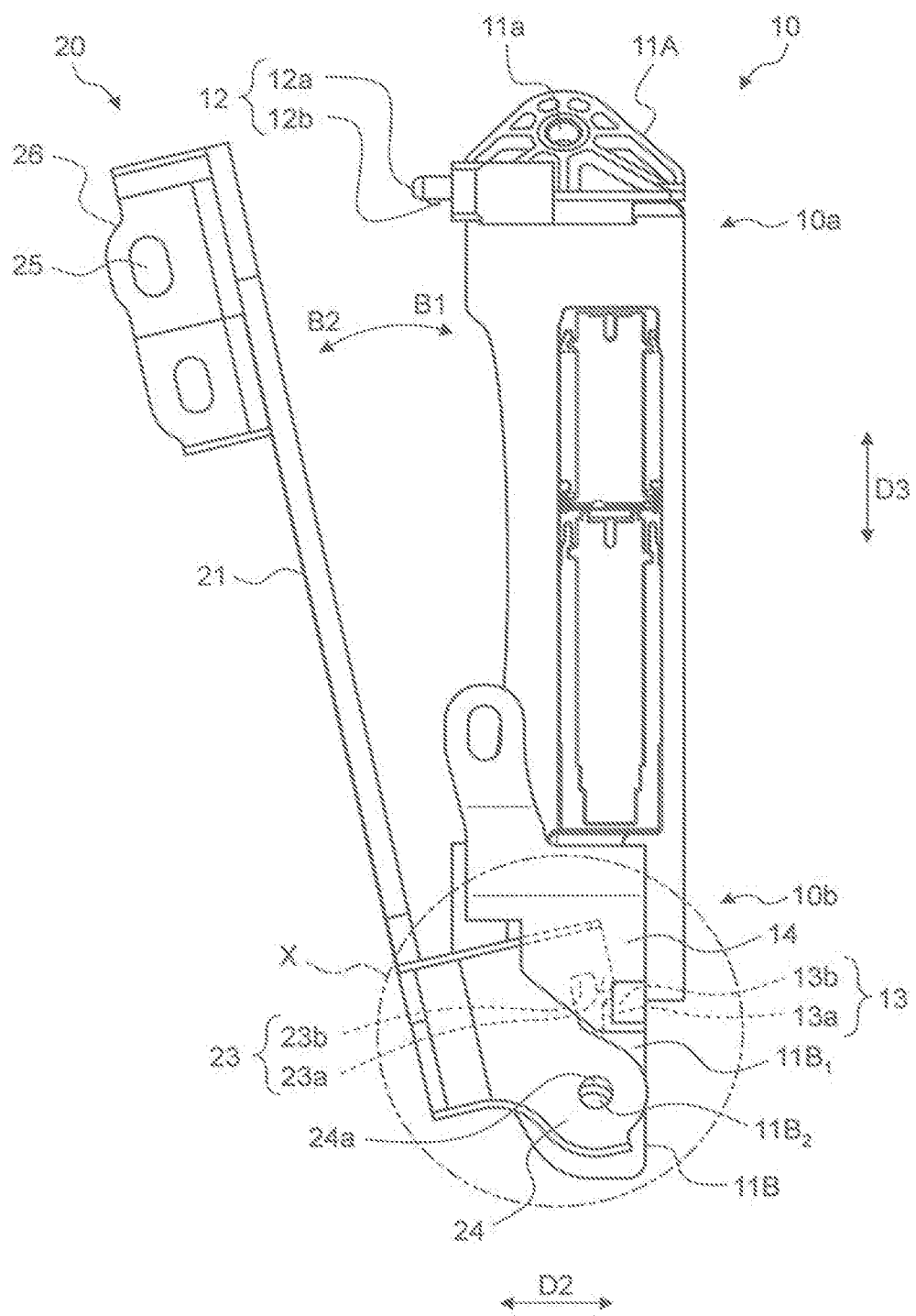
FIG. 8 is a side view for explaining a process of assembling the housing and the housing support member.
Figure 9:
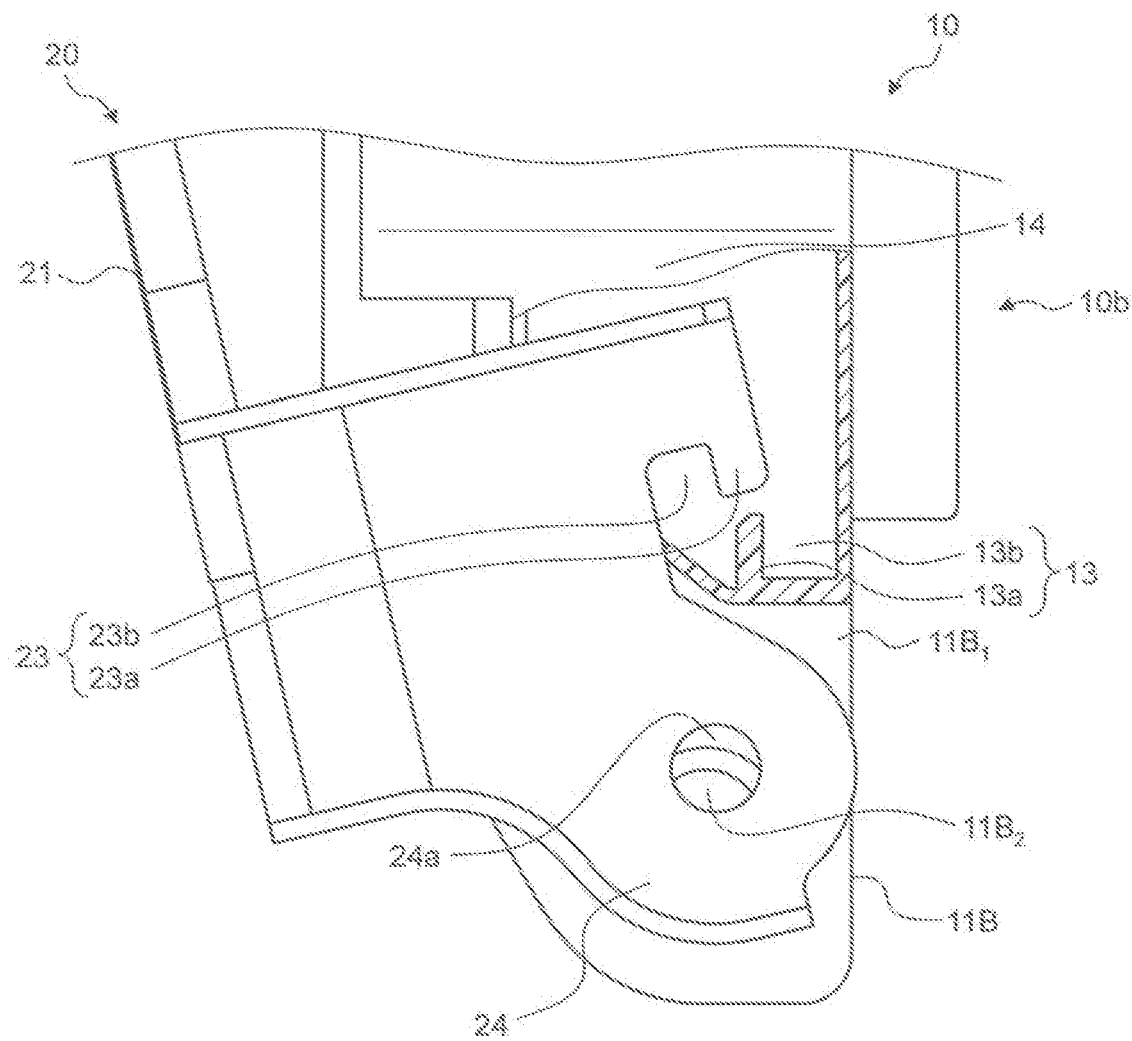
FIG. 9 is an enlarged partial cross-sectional view of the part denoted by X in FIG. 8.
Figure 10:
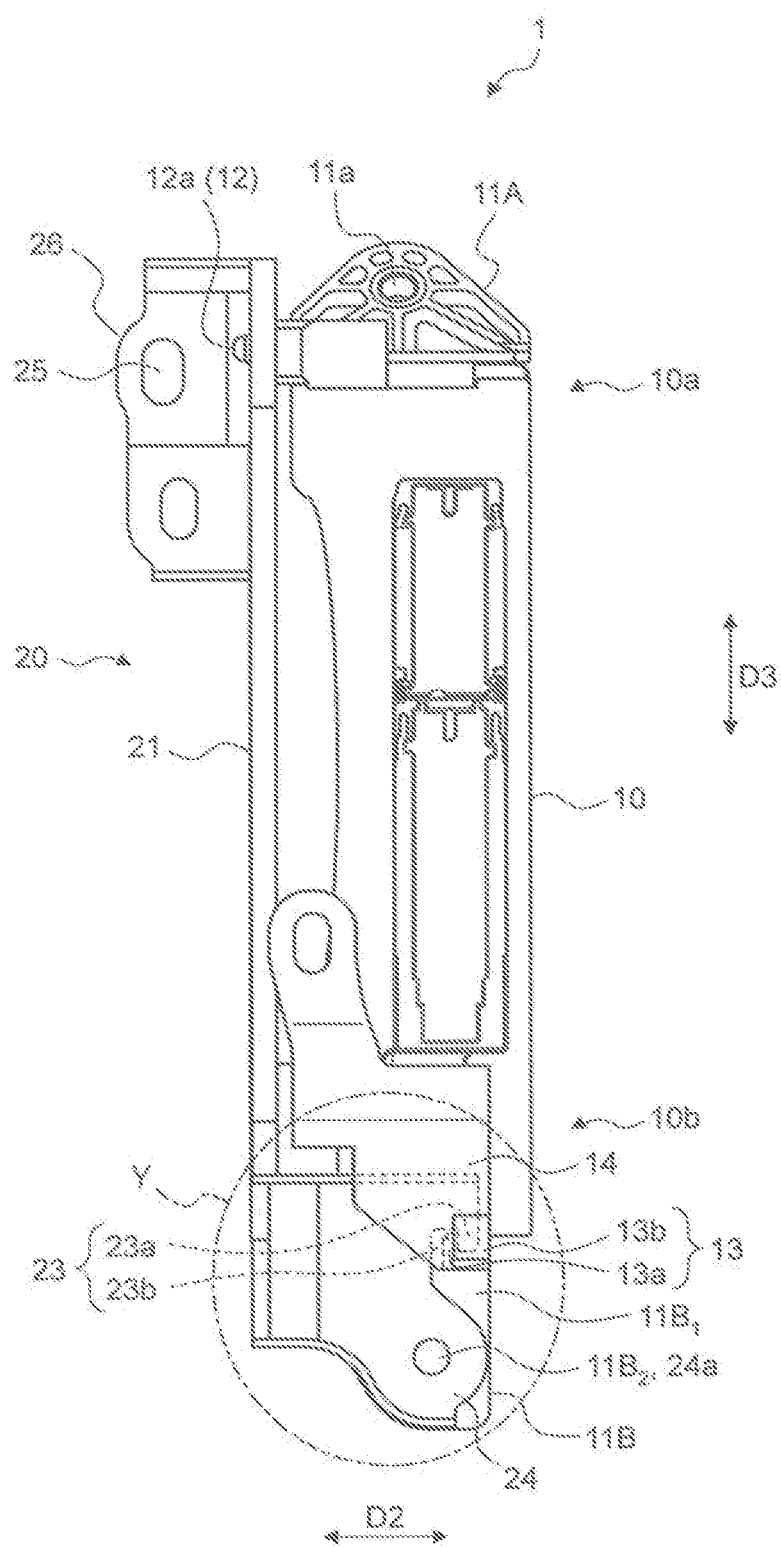
FIG. 10 is a side view for explaining the housing and the housing support member in an assembled state.

To assemble, the worker inserts the second portion to be engaged 23 provided to the first protruding piece 24 of the housing support member 20 into the space 15 between the second foot 11B and the wall 14 of the housing 10, as illustrated in FIGS. 8 and 9. The worker then inserts the protrusions 23a and 13a on the respective second portion to be engaged 23 and second engaging portion 13, provided to the second engaging mechanism 32, into the grooves 13b and 23b, respectively, by rotating the housing support member 20 with respect to the housing 10 in the direction of an arrow B1, about a fulcrum at the first protruding piece 24 (that is, at the end of the extending portion 21 on the side having the second portion to be engaged 23), while letting the first protruding piece 24 to be faced and carried along the perpendicular flat surface 11B$_1$ of the second foot 11B. The worker then keeps rotating the housing support member 20 in such a manner that the inserted protrusion 23a of the second portion to be engaged 23 slides inside the groove 13b provided to the second engaging portion 13, toward the bottom of the groove 13b. In this manner, the second engaging portion 13 and the second portion to be engaged 23 become engaged with each other (FIGS. 10 and 11).

To explain from a different viewpoint, after the worker inserts the second portion to be engaged 23 into the space 15, the worker can then insert the protrusions 13a and 23a into the grooves 23b and 13b, respectively, provided to the second engaging portion 13 and the second portion to be engaged 23, respectively, by rotating the housing 10 in the direction of the arrow B2 with respect to the housing support member 20, about a fulcrum on the side of the second edge region 10b of the housing 10 (that is, the side with the second foot 11B and the second engaging portion 13), while letting the second foot 11B to be faced and carried along the first protruding piece 24. In such a case, the worker keeps rotating the housing 10 in such a manner that the inserted protrusion 13a provided to the second engaging portion 13 slides inside the groove 23b provided to the second portion to be engaged 23, toward the bottom of the groove 23b. In this manner, the second engaging portion 13 and the second portion to be engaged 23 become engaged with each other.

While rotating and sliding the housing support member 20 with respect to the housing 10, or while rotating and sliding the housing 10 with respect to the housing support member 20, the worker also achieves the engagement of the first engaging mechanism 31. In other words, the worker not only achieves the engagement of the second engaging mechanism 32, but also achieves the engagement of the first engaging mechanism 31 by inserting the first engaging portion 12 (the main body 12a and the engaging hook 12b) into the first portion to be engaged (through hole) 22, while rotating and sliding the housing 10 and the housing support member 20 with respect to each other. Because the housing 10 and the housing support member 20 in the electrical junction box 1 are assembled in the manner described above, the shapes of the first engaging mechanism 31, the second engaging mechanism 32, and the elements provided around these mechanisms are designed so as not to obstruct such assembly of the housing 10 and the housing support member 20.

In the electrical junction box 1, in a state that the first engaging mechanism 31 and the second engaging mechanism 32 are both engaged, the through hole 11B$_2$ on the second foot 11B provided to the housing 10 and the through hole 24a on the first protruding piece 24 provided to the housing support member 20 are concentrically positioned. Therefore, the worker can keep (fix) the housing 10 and the housing support member 20 on the side of the second edge region 10b by inserting the male screw member 62 into the through hole 11B$_2$ and the through hole 24a, and tightening the female screw member 63 into the male screw member 62.

To make a wire harness WH by attaching the electric wires 50 before attaching the electrical junction box 1 to the object to be attached 100, the worker can make the wiring to make the wire harness before or after assembling the housing 10 and the housing support member 20, or may assemble the housing 10 and the housing support member 20 as a process of making the wire harness.

The worker then attaches the electrical junction box 1 or the wire harness WH assembled in the manner described above to the object to be attached 100.

The worker inserts the first portion to be attached (stud bolt) 101 of the object to be attached 100 through the first attaching portion (through hole portion) 11*a* of the housing 10, and inserts the second portion to be attached (stud bolt) 102 of the object to be attached 100 through the second attaching portion (through hole portion) 25 of the housing support member 20. In this manner, the electrical junction box 1 or the electrical junction box 1 of the wire harness WH is fixed to the object to be attached 100.

As described above, with the electrical junction box 1 and the wire harness WH according to the embodiment, the housing 10 and the housing support member 20 can be assembled to a temporarily held configuration, temporarily held by the engagement of the first engaging mechanism 31, by performing a simple operation of rotating and sliding the housing 10 and the housing support member 20 with respect to each other about a fulcrum at the first protruding piece 24 of the housing support member 20 or on the side of the second edge region 10*b* of the housing 10.

Furthermore, with the electrical junction box 1 and the wire harness WH according to the embodiment, the first protruding piece 24 and the perpendicular flat surface 11B$_1$ can achieve the positioning and the positional displacement prevention between the housing 10 and the housing support member 20 in the first direction D1 while the housing 10 and the housing support member 20 are in the temporarily held configuration. Furthermore, with the electrical junction box 1 and the wire harness WH, the first engaging mechanism 31 and the second engaging mechanism 32 that are positioned separated from each other can achieve the positioning and the positional displacement prevention between the housing 10 and the housing support member 20 in the second direction D2 while the housing 10 and the housing support member 20 are in the temporarily held configuration. Furthermore, with the electrical junction box 1 and the wire harness WH, the first engaging mechanism 31 can achieve the positioning and the positional displacement prevention between the housing 10 and the housing support member 20 in the third direction D3, while the housing 10 and the housing support member 20 are in the temporarily held configuration. In this manner, the electrical junction box 1 and the wire harness WH can achieve the positioning and the positional displacement prevention between the housing 10 and the housing support member 20 by merely allowing the housing 10 and the housing support member 20 to be temporarily held by each other before fixing the housing 10 and the housing support member 20 firmly with a screw. Furthermore, in the electrical junction box 1 and the wire harness WH, the attaching points of the housing 10 and of the housing support member 20 (the through hole 11B$_2$ on the second foot 11B of the housing 10 and the through hole 24*a* on the first protruding piece 24 of the housing support member 20) have been already concentrically positioned in a state that both of the first engaging mechanism 31 and the second engaging mechanism 32 are engaged. Therefore, with the electrical junction box 1 and the wire harness WH, a worker can easily insert the male screw member 62 into the through holes 11B$_2$, 24*a* without going through a trouble of aligning the positions of the through holes 11B$_2$ and 24*a*, for example, and can easily fix the housing 10 and the housing support member 20 together by tightening the female screw member 63 onto the male screw member 62.

In the manner described above, the electrical junction box 1 and the wire harness WH according to the embodiment can improve the workability in assembling the housing 10 and the housing support member 20. Because the electrical junction box 1 and the wire harness WH enable a production time to be reduced, the operation time of the production facility can also be reduced. Therefore, the electrical junction box 1 and the wire harness WH according to the embodiment can contribute to the environment by reducing the $CO_2$ emission, for example, and can reduce prime costs, as another example.

In the electrical junction box and the wire harness according to the invention, in the process of assembling the housing and the housing support member, the through hole portions provided to the housing and the housing support member have been already concentrically positioned in a state that the first portion to be engaged and the second portion to be engaged are respectively engaged with the first engaging portion and the second engaging portion. Therefore, with the electrical junction box and the wire harness, a worker can easily insert a fixing member into the through hole portions without going through a trouble of aligning the positions of the through hole portions, for example, and can fix the housing and the housing support member to each other easily. Therefore, the electrical junction box and the wire harness can improve the workability in assembling the housing and the housing support member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical junction box comprising:
    a housing configured to hold an electronic component, and is provided with a first attaching portion configured to be attachable to a first portion to be attached of an object to be attached;
    a housing support member configured to hold the housing, and is provided with a second attaching portion configured to be attachable to a second portion to be attached of the object to be attached; and
    a fixing member configured to fix the housing and the housing support member to each other, wherein
    the housing support member includes
        a first portion to be engaged configured to hold the housing and achieve positioning with respect to the housing by being engaged with a first engaging portion of the housing,
        a second portion to be engaged configured to achieve positioning with respect to the housing by being engaged with a second engaging portion of the housing,
        an extending portion configured to extend between the first portion to be engaged and the second portion to be engaged along the housing,
        a through hole portion for inserting the fixing member, that is provided to an end of the extending portion on the second portion to be engaged side,
    the housing includes a through hole portion for inserting the fixing member,
    the through hole portion provided to the housing support member and the through hole portion provided to the housing are disposed to be concentric in a state that the first portion to be engaged and the second portion to be engaged are respectively engaged with the first engaging portion and the second engaging portion, the housing includes a wall that is spaced away from the second engaging portion to define a space that extends between the second engaging portion and the wall, and the second portion to be engaged is positioned in the space such that the second portion to be engaged is located between the second engaging portion and the wall.

2. The electrical junction box according to claim 1, wherein the housing includes an immobilizing portion configured to immobilize an end of the extending portion on the first portion to be engaged side from a side of the housing in a state that the first portion to be engaged and the first engaging portion are engaged with each other.

3. The electrical junction box according to claim 1, wherein the wall is spaced apart from the second portion to be engaged in a first direction, and the first engaging portion protrudes from the housing in a second direction that is substantially perpendicular to the first direction.

4. An electrical junction box comprising:

a housing configured to hold an electronic component, and is provided with a first attaching portion configured to be attachable to a first portion to be attached of an object to be attached;

a housing support member configured to hold the housing, and is provided with a second attaching portion configured to be attachable to a second portion to be attached of the object to be attached; and a fixing member configured to fix the housing and the housing support member to each other, wherein the housing support member includes a first portion to be engaged configured to hold the housing and achieve positioning with respect to the housing by being engaged with a first engaging portion of the housing, a second portion to be engaged configured to achieve positioning with respect to the housing by being engaged with a second engaging portion of the housing, an extending portion configured to extend between the first portion to be engaged and the second portion to be engaged along the housing, a through hole portion for inserting the fixing member, that is provided to an end of the extending portion on the second portion to be engaged side, the housing includes a through hole portion for inserting the fixing member, and the through hole portion provided to the housing support member and the through hole portion provided to the housing are disposed to be concentric in a state that the first portion to be engaged and the second portion to be engaged are respectively engaged with the first engaging portion and the second engaging portion, the second portion to be engaged has a protrusion and a groove that is provided adjacently to the protrusion;

the second engaging portion has a groove in which the protrusion is received, and a protrusion that is received by the groove on the second portion to be engaged.

5. The electrical junction box according to claim 4, wherein the second portion to be engaged is engaged with the second engaging portion by rotating the housing support member with respect to the housing about a fulcrum at an end on the second portion to be engaged side of the extending portion, inserting each of the protrusions into the groove of the other, and sliding the housing support member so that the inserted protrusion of the second portion to be engaged slides inside the groove of the second engaging portion toward a bottom of the groove, or by rotating the housing with respect to the housing support member about a fulcrum at an end of the housing on the second engaging portion side, inserting each of the protrusions into the groove of the other, and sliding the housing so that the inserted protrusion of the second engaging portion slides inside the groove of the second portion to be engaged toward a bottom of the groove.

6. The electrical junction box according to claim 5, wherein the first portion to be engaged is a through hole that is provided to the housing support member, the first engaging portion includes a main body that protrudes from the housing and configured to be inserted into the first portion to be engaged, and an engaging hook that protrudes from the main body and configured to be hooked onto a circumferential rim of the first portion to be engaged, and the main body and the engaging hook are inserted into the first portion to be engaged with the rotation and the slide of the housing support member with respect to the housing, or with the rotation and the slide of the housing with respect to the housing support member.

7. The electrical junction box according to claim 6 wherein the housing includes an immobilizing portion configured to immobilize an end of the extending portion on the first portion to be engaged side from a side of the housing in a state that the first portion to be engaged and the first engaging portion are engaged with each other.

8. The electrical junction box according to claim 6, wherein the housing includes an immobilizing portion configured to immobilize an end of the extending portion on the first portion to be engaged side from a side of the housing in a state that the first portion to be engaged and the first engaging portion are engaged with each other, and the immobilizing portion is provided around a base of the main body.

9. The electrical junction box according to claim 5, wherein the housing includes an immobilizing portion configured to immobilize an end of the extending portion on the first portion to be engaged side from a side of the housing in a state that the first portion to be engaged and the first engaging portion are engaged with each other.

10. The electrical junction box according to claim 4, wherein the housing includes an immobilizing portion configured to immobilize an end of the extending portion on the first portion to be engaged side from a side of the housing in a state that the first portion to be engaged and the first engaging portion are engaged with each other.

11. A wire harness comprising:

an electrical junction box configured to hold an electronic component; and an electric wire that is electrically connected to a terminal of the electronic component, wherein the electrical junction box includes
- a housing configured to hold the electronic component, and is provided with a first attaching portion configured to be attachable to a first portion to be attached of an object to be attached,
- a housing support member configured to hold the housing, and is provided with a second attaching portion configured to be attachable to a second portion to be attached of the object to be attached, and
- a fixing member configured to fix the housing and the housing support member to each other, wherein the housing support member includes
- a first portion to be engaged configured to hold the housing and achieve positioning with respect to the housing by being engaged with a first engaging portion of the housing,
- a second portion to be engaged configured to achieve positioning with respect to the housing by being engaged with a second engaging portion of the housing,
- an extending portion configured to extend between the first portion to be engaged and the second portion to be engaged along the housing, and
- a through hole portion for inserting the fixing member, that is provided to an end of the extending portion on the second portion to be engaged side, the housing includes a through hole portion for inserting the fixing member, the through hole portion provided to the housing support member and the through hole portion provided to the housing are disposed to be concentric in a state that the first portion to be engaged and the second portion to be engaged are respectively engaged with the first engaging portion and the second engaging portion, the housing includes a wall that is spaced away from the second engaging portion to define a space that extends between the second engaging portion and the wall, and the second portion to be engaged is positioned in the space such that the second portion to be engaged is located between the second engaging portion and the wall.

12. A wire harness comprising:
an electrical junction box configured to hold an electronic component; and
an electric wire that is electrically connected to a terminal of the electronic component, wherein the electrical junction box includes
- a housing configured to hold the electronic component, and is provided with a first attaching portion configured to be attachable to a first portion to be attached of an object to be attached,
- a housing support member configured to hold the housing, and is provided with a second attaching portion configured to be attachable to a second portion to be attached of the object to be attached, and
- a fixing member configured to fix the housing and the housing support member to each other, wherein the housing support member includes
- a first portion to be engaged configured to hold the housing and achieve positioning with respect to the housing by being engaged with a first engaging portion of the housing,
- a second portion to be engaged configured to achieve positioning with respect to the housing by being engaged with a second engaging portion of the housing,
- an extending portion configured to extend between the first portion to be engaged and the second portion to be engaged along the housing, and
- a through hole portion for inserting the fixing member, that is provided to an end of the extending portion on the second portion to be engaged side, the housing includes a through hole portion for inserting the fixing member, and the through hole portion provided to the housing support member and the through hole portion provided to the housing are disposed to be concentric in a state that the first portion to be engaged and the second portion to be engaged are respectively engaged with the first engaging portion and the second engaging portion, wherein the second portion to be engaged has a protrusion and a groove that is provided adjacently to the protrusion;

the second engaging portion has a groove in which the protrusion is received, and a protrusion that is received by the groove on the second portion to be engaged.

* * * * *